Feb. 16, 1971   J. L. BUEHLER   3,562,900
METHOD OF MAKING A JEWELRY MOLD
Original Filed Oct. 19, 1966   2 Sheets-Sheet 1

INVENTOR
JOHN L. BUEHLER
ATTORNEYS
Woodard, Weikart, Emhardt, & Naughton

Feb. 16, 1971   J. L. BUEHLER   3,562,900
METHOD OF MAKING A JEWELRY MOLD
Original Filed Oct. 19, 1966   2 Sheets-Sheet 2

INVENTOR
JOHN L. BUEHLER
ATTORNEYS
Woodard, Weikart, Emhardt, & Naughton

United States Patent Office 3,562,900
Patented Feb. 16, 1971

3,562,900
METHOD OF MAKING A JEWELRY MOLD
John L. Buehler, Indianapolis, Ind., assignor to The Buehler Corporation, Indianapolis, Ind., a corporation of Indiana
Original application Oct. 19, 1966, Ser. No. 587,833, now Patent No. 3,515,366, dated June 2, 1970. Divided and this application Mar. 12, 1969, Ser. No. 871,801
Int. Cl. B23p 17/00
U.S. Cl. 29—527.6
3 Claims

ABSTRACT OF THE DISCLOSURE

Method and apparatus for making a mold for wax replicas for use in lost wax casting process. Model is supported in a frame. A mold material is poured into said frame. Screws for later alignment are provided and are molded into said mold. Mold material is cured and cooled. Screws are removed and mold is then cut in two.

CROSS-REFERENCE TO RELATED APPLICATION

This application is a divisional application of my copending application Ser. No. 587,833 filed Oct. 19, 1966, and now Pat. No. 3,515,366.

This invention relates generally to jewelry and more particularly to a mold for making wax replicas for use in a "lost wax" casting process.

It is a general object of the present invention to provide an improved mold for making wax replicas.

A further object is to provide a simplified and improved procedure for making good molds.

Described briefly, in a typical embodiment of the present invention, a jewelry model is secured in a frame secured to a flat smooth surface. A set of screws is mounted on the surface, with threads extending upwardly. A plastic molding compound is poured into the frame, enclosing the model and the screws, except for the slotted heads. It is then cured and removed from the frame. The screws are removed and the mold cut-in-two to remove the model. Then the mold is reassembled with the screws relocated precisely as they were before first removal. The mold is then ready to receive molten wax.

The full nature of the invention will be understood from the accompanying drawings and the following description and claims.

Figure 1:
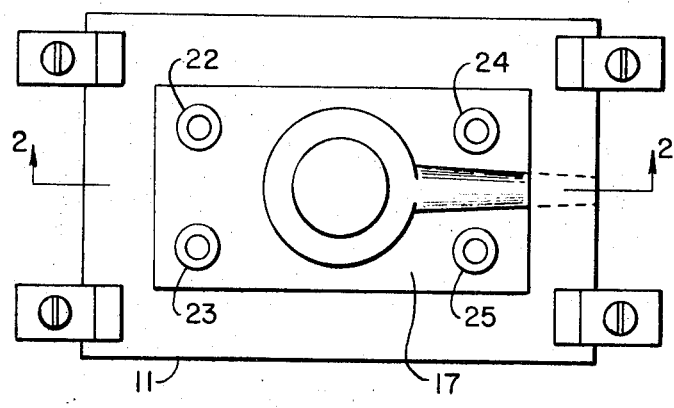
FIG. 1 is a top plan view of a frame with a jewelry model mounted therein and fastener screws disposed around the model ready for pouring in the mold material.
Figure 2:
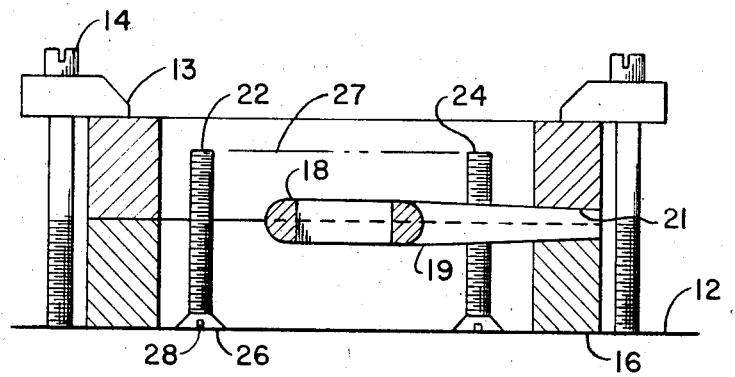
FIG. 2 is a section taken along the line 2—2 in FIG. 1 and viewed in the direction of the arrows and showing the frame and fastener screws resting on a supporting surface.

Referring now to the drawings in detail, a frame 11 of any suitable material including aluminum or steel, for example, is secured to the flat upper surface 12 of a table or bench or other suitable support by the use of clamps 13 having screws 14 therein. Other means may also be provided, the object being to provide a reasonably good seal between the lower face 16 of the frame and the surface 12. This will enable a liquid to be poured into and contained in the space 17 in the center of the frame.

A jewelry model 18 is supported in the space and for simplicity of illustration it is a model of a simple finger ring. A sprue portion 19 extends from the model through an aperture 21 in the frame. In the illustrated example, the frame is provided with upper and lower halves facilitating the mounting of the model by clamping the sprue portion between two halves when the frame is clamped to the bench. The model may be of any suitable material such as aluminum, steel, brass, or other material.

Flat headed screws 22, 23, 24, and 25 are placed in the space 17 with the flat surfaces 26 of their heads resting on the supporting surface 12. The upper ends of the screws define a plane 27 which should be above the upper most portion of the model and preferably is well above it as indicated. At this time the screws are not fastening anything but are simply resting on their flat heads, with the tool receiving recesses (slots 28 in this instance) facing the surface 12.

With the parts in position as just described, a mold material is flowed into the space 17 and this is usually done by pouring it in liquid form from a container into the space. A good material for this purpose is known as "Hysol" No. 4332 available from Hysol Corporation, 1706 Potrero, South El Monte, Calif. or Olean, N.Y. However, any other similar transparent material having about the same physical properties may be used. The Hysol material has a viscosity of 2600-3300 cps. at 77 degrees F. and is oven curable to become translucent or nearly transparent. The space is filled to a level above the model and may be filled to a level over the upper ends of the screws, if desired, although this is not essential. The wall thickness should be at least about one quarter inch. If bubbles are entrained during pouring, they should be allowed to surface, or can be removed by placing the mold and base 12 in a vacuum system at 20 to 30 mm. Hg vacuum for several minutes. Then the material is solidified and if it is desired to use an oven cure, the frame and surface 12 can be moved as a unit into an oven, and cured for an hour at 250 to 300° F. So it is seen that for convenience it may be desirable to provide the surface 12 on a block resting on a bench or table to facilitate insertion of the whole apparatus into an oven for curing.

Figure 3:
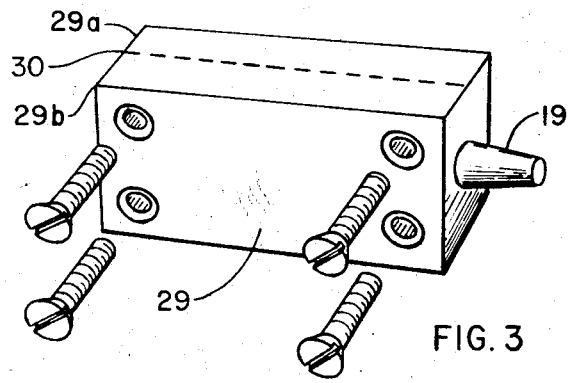
FIG. 3 is a perspective view of the mold removed from the frame and with the screws removed, a dotted line indicating where a cut will be made through the mold to divide it and enable removal of the model.
Figure 4:
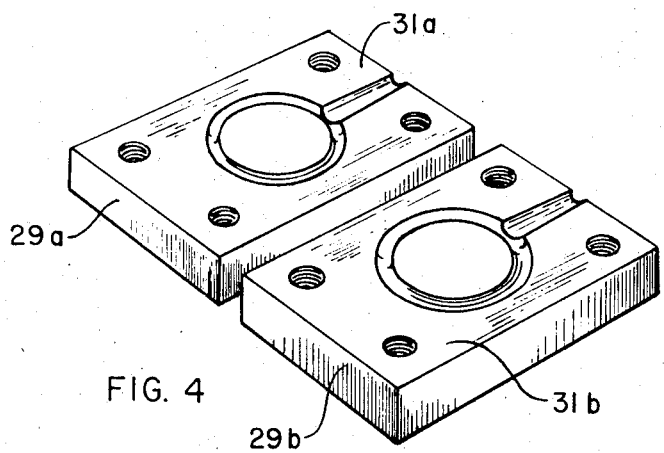
FIG. 4 is a perspective view showing the two halves of the mold resulting from cutting through it along the dotted line in FIG. 3 and removing the model.

After the material has solidified, which can usually be accomplished within an hour, the mold and model are allowed to return to room temperature (about 77° F.). Then the frame is removed and the screws are removed, thus leaving a block 29 of mold material with the sprue end portion of the model sticking out one end, FIG. 3 (FIG. 6 for a three-ring embodiment), for example. The particular material mentioned is transparent in this condition and the model can be seen inside. This feature of the invention facilitates cutting through the block along the dotted line 30 (FIG. 3) which thus becomes a parting line to divide it into the upper portion 29a and lower portion 29b to enable separation of the portions and removal of the model (FIG. 4). The cut can be made on a straight line with a knife so that the surfaces 31a and 31b of the upper and lower parts are perfectly matable cleavage faces which can be placed in perfectly mating abutting relationship when the two parts are subsequently reassembled as will be described.

Figure 5:
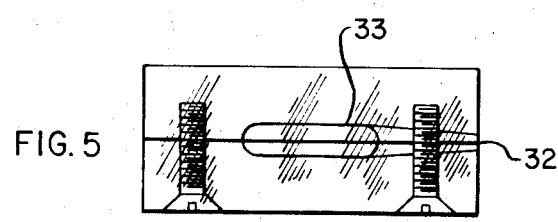
FIG. 5 is an elevational view of the mold as reassembled and with the wax model cast therein.

After the model is removed, the upper and lower parts are placed together with the surfaces 31a and 31b abutting each other. Then the four screws are screwed back into the same holes from which they were removed, following precisely the same molded-in threads resulting from pouring the mold material with the screws in place in the space 17. In this way, perfect registry between the upper and lower parts is obtained (FIG. 5) without the necessity of providing some other means for obtaining registry such as the wavy cut so often employed in making rubber molds according to the prior art practices. Once the screws have again been reseated so that their faces are flush with the lower face of the mold, the mold is ready for making the wax replica by pouring or injecting hot wax into the aperture 32 formed by the sprue of the model. Once the wax replica 33 has solidified in the mold, the screws can again be removed to allow separation of the mold parts and enable removal of the wax replica. The replica can then be used in conventional lost wax casting procedures.

Figure 6:
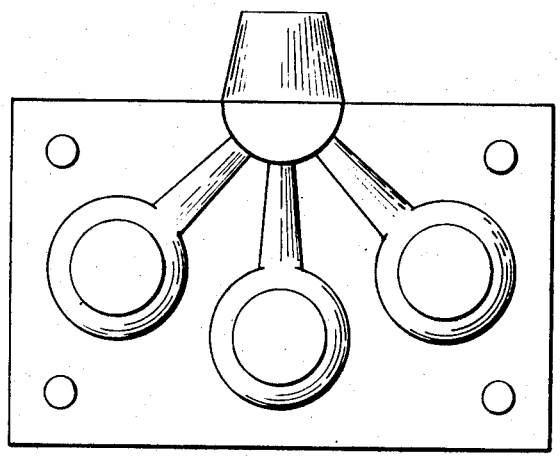
FIG. 6 illustrates a mold with several models therein.

FIG. 6 illustrates a mold with more than one model in it. This mold is made in exactly the same way as described above. It is preferable to arrange the models so as to facilitate cutting the block apart after the mold of material has cured. In the event that any portion is not directly accessible to a cutting instrument from the exterior, as is the case for the center of the ring in the single model embodiment, it is only necessary to pull the two parts away from each other after the knife cut has been made as complete as possible whereupon additional pulling will break the material very near or at the plane in which the knife cut has been made. This can be done without breaking chunks out, as a clean break is attainable. As an alternative, if a material is used which is somewhat more flexible or stretchable than that described herein, the adhering portion can be stretched and severed with the knife as the parts are pulled away from each other.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. A method of making a mold and comprising the steps of:
   providing a reservoir for liquid by mounting a frame on a supporting surface;
   placing a plurality of fasteners within said frame and orienting said fasteners to extend well into the space within said frame;
   mounting a model in said space at an elevation between said surface and a plane defined by upper ends of said fasteners;
   flowing mold material into said space to fill said space to a level above said model;
   solidifying said material in said space;
   removing said frame and said fasteners;
   cutting the solidified mold material into at least two pieces separating at the model;
   removing the model;
   and fastening the two pieces together and establishing correct registry of the two pieces.

2. The method of claim 1 wherein:
   said fasteners are placed on said surface and extend well up into said space,
   said fasteners being removed by unscrewing them from the material,
   and said fasteners are re-installed by screwing them into the same threads from which they were removed.

3. The method of claim 1 and further comprising the steps of:
   mounting additional models in said space at elevations between said surface and said plane before said mold material is flowed into said space.

References Cited

UNITED STATES PATENTS

| | | | |
|---|---|---|---|
| 1,803,478 | 5/1931 | Laukel | 164—45 |
| 2,209,502 | 7/1940 | Annich | 29—527.6 |
| 2,747,230 | 5/1956 | Magnus | 18—42X |
| 3,470,935 | 10/1969 | Prosen | 164—34 |

JOHN F. CAMPBELL, Primary Examiner

D. C. REILEY, Assistant Examiner

U.S. Cl. X.R.

164—45